United States Patent [19]

Grover

[11] 4,438,858
[45] Mar. 27, 1984

[54] FILAMENT WOUND VESSEL WITH IMPROVED POLAR FITTING

[75] Inventor: Richard L. Grover, Lincoln, Nebr.

[73] Assignee: Brunswick Corporation, Skokie, Ill.

[21] Appl. No.: 345,327

[22] Filed: Feb. 3, 1982

[51] Int. Cl.³ .............................................. B65D 8/00
[52] U.S. Cl. ........................................ 220/3; 220/83; 220/414
[58] Field of Search ..................... 220/3, 414, 83, 465; 242/3; 156/170, 172

[56] References Cited

U.S. PATENT DOCUMENTS

| | | |
|---|---|---|
| 2,127,712 | 8/1938 | Bart . |
| 2,312,420 | 3/1943 | Kopf et al. . |
| 2,365,697 | 12/1944 | Grubb . |
| 2,744,043 | 5/1956 | Ramberg . |
| 3,047,191 | 7/1962 | Young .................. 220/3 X |
| 3,073,475 | 1/1963 | Fingerhut . |
| 3,137,405 | 6/1964 | Gorcey . |
| 3,230,122 | 1/1966 | Swaffer et al. . |
| 3,341,052 | 9/1967 | Barthel . |
| 3,358,867 | 12/1967 | Skinner . |
| 3,815,773 | 6/1974 | Duvall et al. ............. 220/3 |
| 3,984,994 | 10/1976 | Ehle et al. ............... 220/465 X |
| 4,369,894 | 1/1983 | Grover et al. ............ 220/83 X |

Primary Examiner—Allan N. Shoap
Assistant Examiner—Robert Petrik
Attorney, Agent, or Firm—Hosier, Niro & Daleiden

[57] ABSTRACT

A filament wound pressure vessel is disclosed and has a generally spherical portion including a polar opening defined by a fitting. A composite comprising a plurality of layers of filaments forms part of the thickness of the vessel, with the layers of filaments wound about the fitting. The fitting comprises a polar boss having a stepped configuration of decreasing diameters in a direction outwardly of the vessel, whereby sequential layers of filaments lay against sequentially smaller diameters of the fitting. The polar boss may comprise part of a liner for the vessel about which the layers of filaments are wound.

10 Claims, 4 Drawing Figures

FILAMENT WOUND VESSEL WITH IMPROVED POLAR FITTING

BACKGROUND OF THE INVENTION

This invention relates generally to filament wound vessels and particularly to an improved polar fitting or boss about which a plurality of layers of filaments are wound.

Filament wound vessels often are constructed in a spherical shape or a cylindrical shape with generally spherical end portions for use in high pressure container applications. In many circumstances, the qualities of lightweight construction and high resistance to fragmentation and corrosion damage are highly desirable with such pressure vessels. Therefore, for some years, these design criteria have been satisfactorily met by the development of high pressure containers fabricated of laminated layers of wound fiberglass filaments or various types of synthetic filaments which are bonded together by a thermal-setting epoxy resin.

Such vessels have other important advantages, including filament winding patterns which produce a quasi-isotropic composite. Such composite pressure vessels currently are used in the aerospace industry, for instance. In some applications, the vessels are required to contain ultra-high pressures, operating at 25,000 p.s.i. with design burst values in the 50,000 p.s.i. range. Composite pressure vessels are especially appropriate for such high pressure applications, since the manufacture of a thicker vessel wall structure essentially requires winding more layers of filaments. However, pressure vessels with thick walls are characterized by steep strain gradients through the wall, the inner strains being quite high when compared with those at the outer surface. For instance, an important parameter in controlling the strain gradient is the transverse or radial stiffness of the composite. Transverse stiffness is influenced by the wind angle of the vessel, as well as any delaminations or other defects induced during fabrication. Of major consideration, and thus a major problem, is possible composite buildup which results in severe bridging of the fibers.

The problem of composite buildup and fiber bridging is particularly prevalent in polar wound vessels, such as spherical vessels or other vessels having a spherically shaped end. Most often, a polar opening is provided with a fitting or boss disposed in the opening and protruding outwardly therefrom. The polar boss may comprise an integral part of a thin-walled metal liner of the vessel. The vessel is wound by a known method in a numerically controlled winding apparatus using a sequence of polar winding patterns wound with incrementally increasing wind angles away from the polar opening or fitting. The required thickness is obtained by repeating this sequence of patterns an integral number of times corresponding to the desired number of layers.

The fabrication of a thick cylindrical vessel requires special attention at the polar opening or fitting which normally is surrounded by a generally spherical portion of the vessel. The composite buildup adjacent to a conventional polar boss becomes excessive causing the curvature of the fiber path to become negative in certain regions of the spherical or dome portion of the vessel. This can result in the filaments losing contact with the surface being wound, such as a previously wound layer of filaments, and is referred to as "bridging." Bridging can cause possible premature dome failure. In addition, bridging can severely limit the vessel performance of an ultra-high pressure vessel due to the high composite porosity and resulting low transverse (through the thickness) compressive stiffness and strength. Also the composite shear strength is reduced which may be detrimental even in thin-walled vessels.

Another problem which arises due to the thickness of the spherical wall portion is that due to the low transverse modulus of elasticity of the composites, the radial strain is large in comparison with the strain in the planes of the filaments causing lower strain in the outer helical fibers relative to the inner helical fibers. As the wall thickness of the vessel increases, the share of the load carried by the outer fibers diminishes so that the burst pressure of a particular vessel has an upper limit.

The present invention is directed to solving these problems of the prior art by providing a filament wound pressure vessel with a new and improved polar fitting or boss.

SUMMARY OF THE INVENTION

An object, therefore, of the present invention is to provide a new and improved filament wound pressure vessel and particularly such a vessel with a new and improved polar fitting or boss.

In the exemplary embodiment of the invention, a filament wound pressure vessel is disclosed and has a generally spherical end portion including a polar opening defined by a fitting. A composite comprising a plurality of layers of filaments forms part of the thickness of the vessel, with the filaments wound about the fitting. The fitting comprises a polar boss having shoulder means defining a stepped configuration of decreasing diameters in a direction outwardly of the vessel whereby sequential layers of filaments lay against sequentially smaller diameters of the fitting. The fitting may comprise an integral part of a thin metal liner of the vessel about which the layers of filaments are wound. The fitting shown herein has shoulder means defining a plurality of generally uniformly dimensioned steps of decreasing diameters.

This unique stepped boss design solves the bridging problem described above. With the stepped boss, the wind angle can be chosen in order that each helical layer of filaments lies adjacent to the largest unwound step diameter. When the composite thickness reaches the top or extremity of the step, the wind pattern is changed in order that the band lay adjacent to the next smaller boss step diameter. The invention contemplates this unique method of fabricating a filament wound vessel.

In addition, the thick-wall problem or effect described above is reduced and the pressure limit raised by using the unique stepped boss of the present invention. Since the composite thickness near the step is reduced, the thick-wall effect described above is reduced.

The stepped boss of the present invention also offers substantial weight savings as well as substantial structural advantage in the manner in which load is transmitted between a vessel liner and the composite in the dome area or spherical portion of the vessel.

Other objects, features and advantages of the invention will be apparent from the following detailed description taken in connection with the accompanying drawings.

DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE INVENTION

Figure 1:
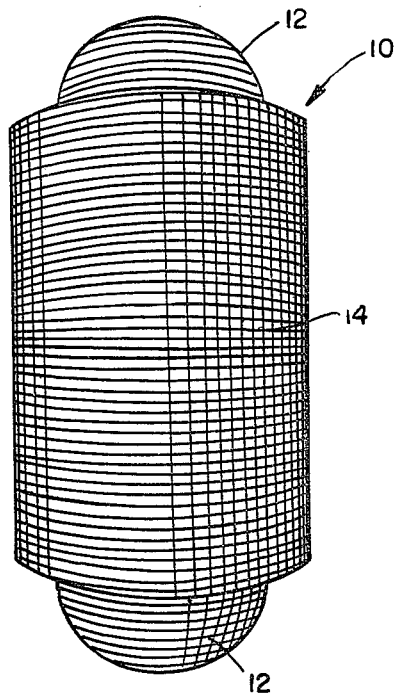
FIG. 1 is a perspective view of a cylindrical wound pressure vessel with generally spherical end portions in which the novel polar boss of the present invention is utilized.

Referring to the drawings in greater detail, and first to FIG. 1, a cylindrical filament wound pressure vessel, generally designated 10, is shown with a generally spherical portion 12 at each end of a central cylindrical portion 14. The technology of filament wound vessels has found considerable application in the area of high performance pressure vessels. Both spherical and cylindrical configurations are available, the cylindrical shape having significantly more versatility due to its ability to increase the stored volume simply by increasing the vessel length while keeping the diameter constant. It should be understood that the vessel 10 shown in FIG. 1 is representative only in order to illustrate the utility of the novel stepped polar boss of the present invention, as described hereinafter. The filaments of the composite may vary. For instance, a vessel may be wound with interspersed helical and circumferential glass windings, followed by interspersed Kevlar helical and carbon fiber circumferential windings, and finally by a consolidated layer of carbon fiber circumferential windings. The external surface of the final carbon composite layer may be machined to the configuration shown in FIG. 1 and the entire composite surface covered with a barrier coat.

Figure 2:
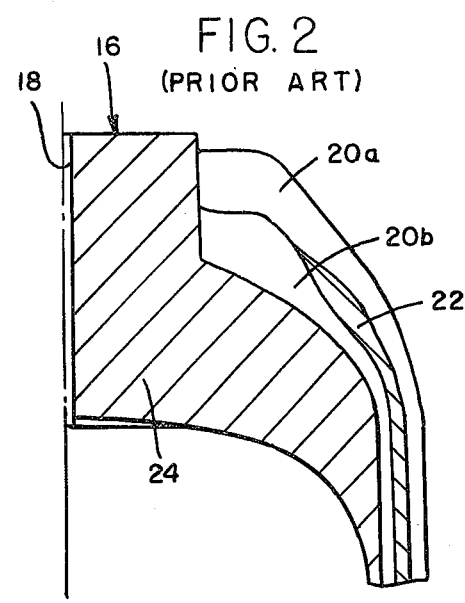
FIG. 2 is a fragmented, somewhat schematic sectional view of a quadrant of a spherical portion of a vessel in the area of the polar opening thereof, and illustrating a polar boss of the prior art.

A polar opening is provided in one or both spherical portions 12 and defined by a fitting or polar boss. Referring to FIG. 2, a conventional polar boss, generally designated 16, of the prior art is shown to include a polar opening 18 for a pressure vessel. A plurality of layers 20a and 20b of winding patterns of filaments are schematically shown wound about polar boss 16, with epoxy disposed between the layers. Only two layers are shown to facilitate the illustration. When winding a thick-walled vessel, the composite thickness near conventional boss 16 becomes excessive causing the curvature of the fiber path to become negative in certain regions of the dome. This can result in the fibers losing contact with the surface being wound, referred to as "bridging," and possible premature dome failure may occur. In a conventional polar boss as shown, the only solution to avoid bridging is to increase the mid-band wind radius at the apex of the winding path in order to build up the areas of negative curvature as shown by a composite layer 22. For instance, layers 20a and 20b may comprise Kevlar and buildup layer 22 may comprise glass. This winding method has the disadvantage that the wind radius must coincide with the location of the greatest deviation from high positive curvature. Conventional boss 16 has a large flange root thickness 24 which is necessary due to the high shear stress that exists in that area. In addition, since there is no boss neck to locate the minimum wind radius, uncertainties arise as to the actual location of the fibers in the dome or spherical portion of the vessel.

Figure 3:
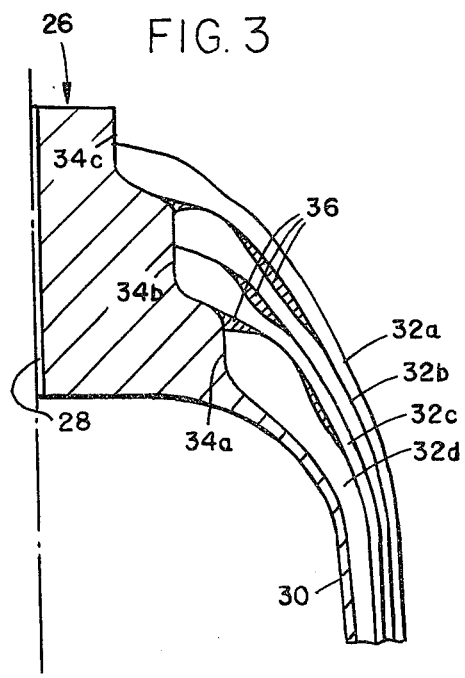
FIG. 3 is a view similar to that of FIG. 2, illustrating the novel stepped polar boss of the present invention.

Referring to FIG. 3, the present invention contemplates a fitting or polar boss, generally designated 26, having a polar opening 28. As with the prior art boss of FIG. 2, boss 26 may comprise an integral portion of a thin-walled metal liner 30 about which layers 32a-32d of filament winding patters are wound. Polar boss 26 has shoulder means defining a stepped configuration of decreasing diameters in a direction outwardly of the vessel whereby sequential layers 32a-32b of filaments lay against sequentially small diameters of the boss, as shown in FIG. 3. In particular, the shoulder means defines a plurality of generally uniformly dimensioned steps 34a-34c, with step 34c defining a reduced diameter neck to locate the minimum wind radius. Of course, the number of steps, as well as the dimensions and uniformity thereof can be varied within the concepts of the present invention.

As seen in FIG. 2, and particularly layers 32c and 32b laying against step 34b, it will be understood that the wind angle of each layer is such as to lay adjacent to the largest unwound step until the composite thickness reaches the top or extremity of the step, whereupon the wind angle of the wind pattern is changed such that the layers lay adjacent the next smaller unwound step diameter. The present invention contemplates this unique method of fabricating a filament wound vessel utilizing the novel stepped boss 26.

With the boss construction and method of the present invention, bridging of the fibers is eliminated. With the stepped boss, each minimum wind radius can be specified by the designer. If a hybrid composite is desired, a mid-band wind radius can be specified so that each filament type is used most efficiently. For example, if two fibers with different tensile moduli of elasticity were used, the two fibers would be wound so that each would be exposed to the same percentage of their ultimate strains, in the cylindrical region, for a given pressure. Also, since the wind radius is accurately located by the step, the thickness can be accurately predicted.

Figure 4:
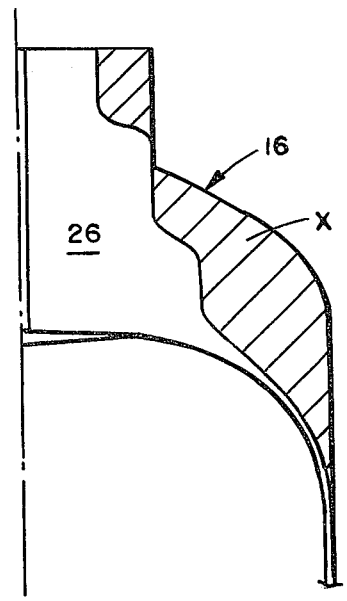
FIG. 4 is a diagrammatic view comparing the mass differences between the prior art polar boss of FIG. 2 and the polar boss of the present invention of FIG. 3.

The stepped design of the boss of the present invention affords several additional benefits. The thickness of the liner 30 at the polar opening is dictated by shear strength requirements to prevent blowout of the boss, but the thickness is not necessary or desirable away from the opening. The stepped boss design allows for a stepped decrease in thickness and significant weight reduction of the liner. FIG. 4 diagrammatically shows boss 16 of the prior art (FIG. 2) superimposed over stepped boss 26 of the present invention. The shaded area "X" represents the metal saved by using the stepped boss and, through calculation, is approximately 60 percent. The composite weight also is reduced since the volume enclosed by the composite is less.

With the stepped decrease in thickness of boss 26, a smooth transition in the liner 30 between the cylinder and the dome is afforded at a tangent line, thus affording a high strain gradient at this critical point in the liner.

Lastly, and quite importantly, in a single step liner as shown by the prior art of FIG. 2, the internal filaments carry most of the stress in the dome due to low transverse composite stiffness and thick wall effects. With the stepped boss of the present invention, the boss acts as a rigid body, transferring load not only to the inner composite but to intermediate composite layers are each step interface, such as layers 32c, 32b. This even distribution of load reduces the shear running load and bending moment in both the composite and the metal dome. It also will be noted in FIG. 3 that the layers are bonded together by a thermo-setting epoxy resin 36 and no fill composite layers, such as layer 22 in FIG. 2, is required.

It will be understood that the invention may be embodied in other specific forms without departing from the spirit or central characteristics thereof. The present examples and embodiments, therefor, are to be considered in all respects as illustrative and not restrictive, and the invention is not to be limited to the details given herein.

What is claimed is:

1. In a filament wound pressure vessel which has a generally spherical portion including a polar opening defined by a fitting, a composite comprising a plurality of layers of filaments forming part of the thickness of the vessel and wound about the fitting, said fitting comprising a polar boss having shoulder means defining a stepped configuration of decreasing diameters in a direction outwardly of the vessel whereby sequential layers of filaments lay against sequentially smaller diameters of said fitting, the wind angle of each layer being such as to lay adjacent to the largest unwound step diameter until the composite thickness reaches the extremity of the step where the wind angle of the wind pattern is changed such that the layers lay adjacent the next smaller unwound step diameter.

2. In a filament wound pressure vessel as set forth in claim 1, wherein said polar boss comprises part of a liner for said vessel about which said layers of filaments are wound.

3. In a filament wound pressure vessel as set forth in claim 1, wherein said shoulder means defines a plurality of generally uniformly dimensioned steps of decreasing diameters.

4. A fitting for use in a filament wound vessel which has a generally spherical portion including a polar opening defined by said fitting, and a plurality of layers of filaments forming a part of the thickness of the vessel and wound about the fitting, the improvement wherein said fitting comprises a polar boss having shoulder means defining a stepped configuration of decreasing diameters in a direction outwardly of the vessel whereby sequential layers of filaments lay against sequentially smaller diameters of said fitting, the wind angle of each layer being such as to lay adjacent to the largest unwound step diameter until the composite thickness reaches the extremity of the step where the wind angle of the wind pattern is changed such that the layers lay adjacent the next smaller unwound step diameter.

5. The fitting of claim 4, wherein said polar boss comprises part of a liner for said vessel about which said layers of filaments are wound.

6. The fitting of claim 5, wherein said shoulder means defines a plurality of generally uniformly dimensioned steps of decreasing diameters.

7. In a filament wound pressure vessel which has a generally spherical portion including a polar opening defined by a fitting, a composite comprising a plurality of layers of filaments forming part of the thickness of the vessel and wound about the fitting, each layer comprising a sequence of winding patterns with increasing wind angles away from the polar opening, said fitting comprising a polar boss having shoulder means defining a stepped configuration of decreasing diameters in a direction outwardly of the vessel whereby sequential layers of filaments lay against sequentially smaller diameters of said fitting, and wherein the wind angle of each layer is such as to lay adjacent to the largest unwound step diameter until the composite thickness reaches the extremity of the step where the wind angle of the wind pattern is changed such that the layers lay adjacent the next smaller unwound step diameter.

8. In a filament wound pressure vessel as set forth in claim 7, wherein said polar boss comprises part of a liner for said vessel about which said layers of filaments are wound.

9. In a filament wound pressure vessel as set forth in claim 8, wherein said shoulder means defines a plurality of generally uniformly dimensioned steps of decreasing diameters.

10. A method of fabricating at least a generally spherical portion of a filament wound pressure vessel wherein a plurality of layers of filaments form part of the thickness of the vessel, comprising:
    providing a fitting with a polar opening and with shoulder means defining a stepped configuration of decreasing diameters in a direction outwardly of the vessel, and
    winding said layers of filaments about said polar boss whereby sequenial layers of filaments lay against sequentially smaller diameters of said fitting, the wind angle of each layer being such as to lay adjacent to the largest unwound step diameter until the thickness reaches the extremity of the step, and changing the wind angle of the wind pattern such that the layers lay adjacent the next smaller unwound step diameter.

* * * * *

UNITED STATES PATENT AND TRADEMARK OFFICE
CERTIFICATE OF CORRECTION

PATENT NO. : 4,438,858
DATED : March 27, 1984
INVENTOR(S) : Richard L. Grover

It is certified that error appears in the above—identified patent and that said Letters Patent is hereby corrected as shown below:

Column 5, line 9, change "are" to --at--.

In The Claims

Claim 6, line 1, change the numeral "5" to --4--.

Claim 9, line 2, change the numeral "8" to --7--.

Signed and Sealed this

Twenty-eighth Day of August 1984

[SEAL]

Attest:

GERALD J. MOSSINGHOFF

Attesting Officer    Commissioner of Patents and Trademarks